United States Patent
Faibish et al.

(10) Patent No.: US 10,838,643 B2
(45) Date of Patent: Nov. 17, 2020

(54) ELASTICALLY MANAGING CACHE FOR SUB-BLOCK DEDUPLICATION

(71) Applicant: EMC IP Holding Company LLC, Hopkinton, MA (US)

(72) Inventors: Sorin Faibish, Newton, MA (US); Philippe Armangau, Acton, MA (US); Istvan Gonczi, Berkley, MA (US); Ivan Bassov, Brookline, MA (US); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/176,703

(22) Filed: Oct. 31, 2018

(65) Prior Publication Data

US 2020/0133546 A1    Apr. 30, 2020

(51) Int. Cl.
  *G06F 12/12*  (2016.01)
  *G06F 3/06*   (2006.01)
  *G06F 12/123* (2016.01)
  *G06F 16/23*  (2019.01)

(52) U.S. Cl.
  CPC .......... *G06F 3/0641* (2013.01); *G06F 3/0608* (2013.01); *G06F 3/068* (2013.01); *G06F 3/0652* (2013.01); *G06F 12/124* (2013.01); *G06F 16/2379* (2019.01); *G06F 2212/1044* (2013.01)

(58) Field of Classification Search
  CPC ............................. G06F 12/124; G06F 12/12
  USPC ....................................................... 711/151
  See application file for complete search history.

(56) References Cited

U.S. PATENT DOCUMENTS

| 8,799,601 | B1* | 8/2014 | Chen .................. G06F 3/0608 711/161 |
| 9,569,455 | B1 | 2/2017 | Bono et al. |
| 10,037,336 | B1 | 7/2018 | Hu et al. |
| 2013/0097380 | A1* | 4/2013 | Colgrove ............. G06F 3/0608 711/118 |
| 2014/0115260 | A1* | 4/2014 | Maybee ............. G06F 12/0866 711/136 |
| 2018/0004434 | A1* | 1/2018 | Khan .................... G06F 3/0613 |
| 2018/0039442 | A1 | 2/2018 | Shadrin et al. |
| 2018/0285379 | A1* | 10/2018 | Dain ...................... H04L 67/10 |

OTHER PUBLICATIONS

Armangau, Philippe, et al.; "Inline Deduplication of Compressed Data," U.S. Appl. No. 14/980,944, filed Dec. 28, 2015.

(Continued)

*Primary Examiner* — Gautam Sain
(74) *Attorney, Agent, or Firm* — BainwoodHuang

(57) ABSTRACT

A technique for managing cache in a storage system that supports data deduplication renders each of a set of data blocks as multiple sub-blocks and loads a cache-resident digest database on a per-block basis, selectively creating new digest entries in the database for all sub-blocks in a block, but only for blocks that contain no duplicate sub-blocks. Sub-blocks of blocks containing duplicates are excluded. By limiting digest entries to sub-blocks of blocks that contain no duplicates, the storage system limits the size of the digest database, and thus of the cache, while also biasing the contents of the digest database toward entries that are likely to produce deduplication matches in the future.

21 Claims, 7 Drawing Sheets

(56) References Cited

OTHER PUBLICATIONS

Armangau, Philippe, et al.; "Speeding De-Duplication Using a Temporal Digest Cache," U.S. Appl. No. 15/668,388, filed Aug. 3, 2017.

Armangau, Philippe, et al.; "Speeding Deduplication Using a Most Wanted Digest Cache," U.S. Appl. No. 15/799,117, filed Oct. 31, 2017.

Swift, Jeremy; "Deduplication and Compression of Data Segments in a Data Storage System," U.S. Appl. No. 15/976,371, filed May 10, 2018.

\* cited by examiner

ELASTICALLY MANAGING CACHE FOR SUB-BLOCK DEDUPLICATION

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Data deduplication may operate in the background, after redundant data blocks have been stored, and/or operate inline with storage requests. Inline deduplication matches newly arriving data blocks with previously stored data blocks and configures pointers accordingly, thus avoiding initial storage of redundant copies.

A common deduplication scheme involves computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks byte-by-byte. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY

Conventional deduplication schemes can fail to detect redundant data when blocks are similar but not identical. For example, a data storage system might store multiple copies of a given block, which are nearly identical except for a timestamp or label, which is unique to each copy. Owing to the randomizing nature of the hash function, digests computed from slightly different copies of a data block differ widely from one another, such that deduplication is unable to detect the redundant content. Many opportunities to improve storage efficiency are therefore missed.

In an effort to respond to such missed opportunities, it has been proposed to perform deduplication at sub-block granularity. For instance, rather than trying to match an entire data block to a previously-stored block, a deduplication process instead renders a data block as multiple sub-blocks and performs deduplication by matching sub-blocks. As sub-blocks are smaller than data blocks, performing deduplication at sub-block granularity usually improves storage efficiency, especially when differences between data blocks are localized to particular sub-blocks.

Unfortunately, performing deduplication at sub-block granularity can come at a high cost in terms of cache resources, particularly when performing deduplication inline. For instance, instead of caching only one digest and its associated metadata for each block received, a storage system receiving a new block may instead cache digests and metadata for each of the multiple sub-blocks of the new block. Without special care, deduplication caches can grow quickly to excessive sizes. Administrators may impose limits on cache resources available for deduplication, but limiting the available cache can reduce deduplication efficiency, erasing many of the benefits of performing deduplication at the sub-block level.

To address the complex tradeoffs inherent in sub-block deduplication, an improved technique renders each of a set of data blocks as multiple sub-blocks and loads a cache-resident digest database on a per-block basis, selectively creating new digest entries in the database for all sub-blocks in a block, but only for blocks that contain no duplicate sub-blocks. Sub-blocks of blocks containing duplicates are excluded. Advantageously, the improved technique avoids initial creation of digest entries for sub-blocks that are unlikely to result in future matches, thus biasing the cached entries in favor of entries that are more likely to produce matches later. Cache sizes can thus be limited without unduly sacrificing deduplication efficiency, enabling storage systems to operate with less volatile memory and at lower cost. We term the resulting operation of the cache "elastic," because the cache tends to expand at first, when all sub-blocks are novel, but then tends to shrink over time as duplicate sub-blocks are detected.

As used herein, a sub-block is identified as "novel" when it does not match any digest entry already stored in the digest database and is identified as "duplicate" when it matches a digest entry already stored in the digest database.

Certain embodiments are directed to a method of managing cache in a data storage system that supports data deduplication. The method includes performing, for each of a set of data blocks in the cache, an evaluation operation configured to (i) produce a first result in response to the data block containing no sub-blocks that match any digest entries in a digest database, and (ii) produce a second result in response to the data block containing at least one sub-block that matches a digest entry in the digest database, the digest database stored in the cache. For each of the set of data blocks for which the evaluation operation produces the first result, the method further includes creating multiple new digest entries in the digest database, one new digest entry for each of the sub-blocks of the respective data block. For each of the set of data blocks for which the evaluation operation produces the second result, the method includes creating no new digest entries in the digest database for any of the sub-blocks of the respective data block.

Other embodiments are directed to a data storage system constructed and arranged to perform a method of managing cache, such as the method described above. Still other embodiments are directed to a computer program product. The computer program product stores instructions which, when executed by control circuitry of a data storage system, cause the data storage system to perform a method of managing cache, such as the method described above.

In some examples, the digest database contains multiple digest entries. Each of the digest entries is provided for a respective sub-block and includes a reference to a parent block in the cache that contains the respective sub-block.

Some examples implement an eviction policy for the cache. According to some variants, the eviction policy is an LRU (Least Recently Used) policy.

In some examples, the technique further includes providing a parent-child data structure (PCDS) that associates parent blocks in the cache with respective references to digest entries of child sub-blocks of the respective parent blocks.

According to some examples, the PCDS stores a respective record for each of multiple parent blocks, each record located using a respective key that uniquely identifies the record, each key formed by performing a mathematical operation on contents of the parent block.

In some examples, the PCDS is stored in the cache, and the technique further includes identifying a parent block to be evicted from the cache in accordance with the eviction policy, performing the mathematical operation on the identified parent block to produce a parent key, performing a look-up in the PCDS for a parent record uniquely identified by the parent key, and evicting, from the digest database, each digest entry referenced in the parent record.

According to some examples, the technique further includes evicting the parent record from the PCDS and evicting the identified parent block from the cache.

In some examples, the technique further includes forming a new block in the cache, performing the mathematical operation on the new block to produce a new key, and performing a look-up in the PCDS for a record uniquely identified by the new key. In response to finding the record uniquely identified by the new key, the technique further includes performing a full-block-based deduplication operation on the new block.

According to some examples, the technique further includes forming a set of prior data blocks in the cache. For each of the set of prior data blocks, a new digest entry is created in the digest database for each novel sub-block contained in the prior data block, regardless of whether the prior data block also contains any duplicate sub-blocks.

In some examples, the cache operates in multiple modes. The modes include (i) a first mode in which the cache performs the evaluation operation and selectively creates digest entries for all sub-blocks or for no sub-blocks of respective data blocks, depending on results of the evaluation operation, and (ii) a second mode in which the cache creates new entries for novel sub-blocks, regardless of whether the novel sub-blocks have siblings that are duplicate sub-blocks.

In some examples, wherein the cache operates in the first mode in response to a fullness of the cache exceeding a predetermined water mark, and the cache operates in the second mode in response to the fullness of the cache being less than the predetermined water mark.

According to some examples, upon identifying multiple novel sub-blocks and a set of duplicate sub-blocks in a data block, the technique further includes deduplicating each of the set of duplicate sub-blocks by matching each duplicate sub-block to a sub-block already stored in the data storage system, placing the novel sub-blocks together in a single dataset, compressing the dataset to produce a compressed dataset, and storing the compressed data set in a storage extent.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for managing cache in a data storage system that supports data deduplication includes rendering each of a set of data blocks as multiple sub-blocks and loading a cache-resident digest database on a per-block basis, selectively creating new digest entries in the database for all sub-blocks in a block, but only for blocks that contain no duplicate sub-blocks. Sub-blocks of blocks containing duplicates are excluded. The effect of selectively avoiding creation of new entries is to limit the size of the digest database and thus of the cache.

We have observed that novel sub-blocks tend not to be repeated when they arrive in data blocks that also contain duplicate sub-blocks. Thus, if duplicate sub-blocks accompany novel sub-blocks once, they are likely to accompany different novel sub-blocks later, such that the probability is low that such novel sub-blocks will become duplicates in the future. Embodiments of the invention hereof leverage this observation by selectively preventing new deduplication digest entries from being created for novel sub-blocks that share the same data blocks with duplicate sub-blocks. Such embodiments promote efficient sub-block deduplication to proceed while keeping cache demands at manageable levels, and thus furnish a critical enabler of successful sub-block deduplication.

Figure 1:
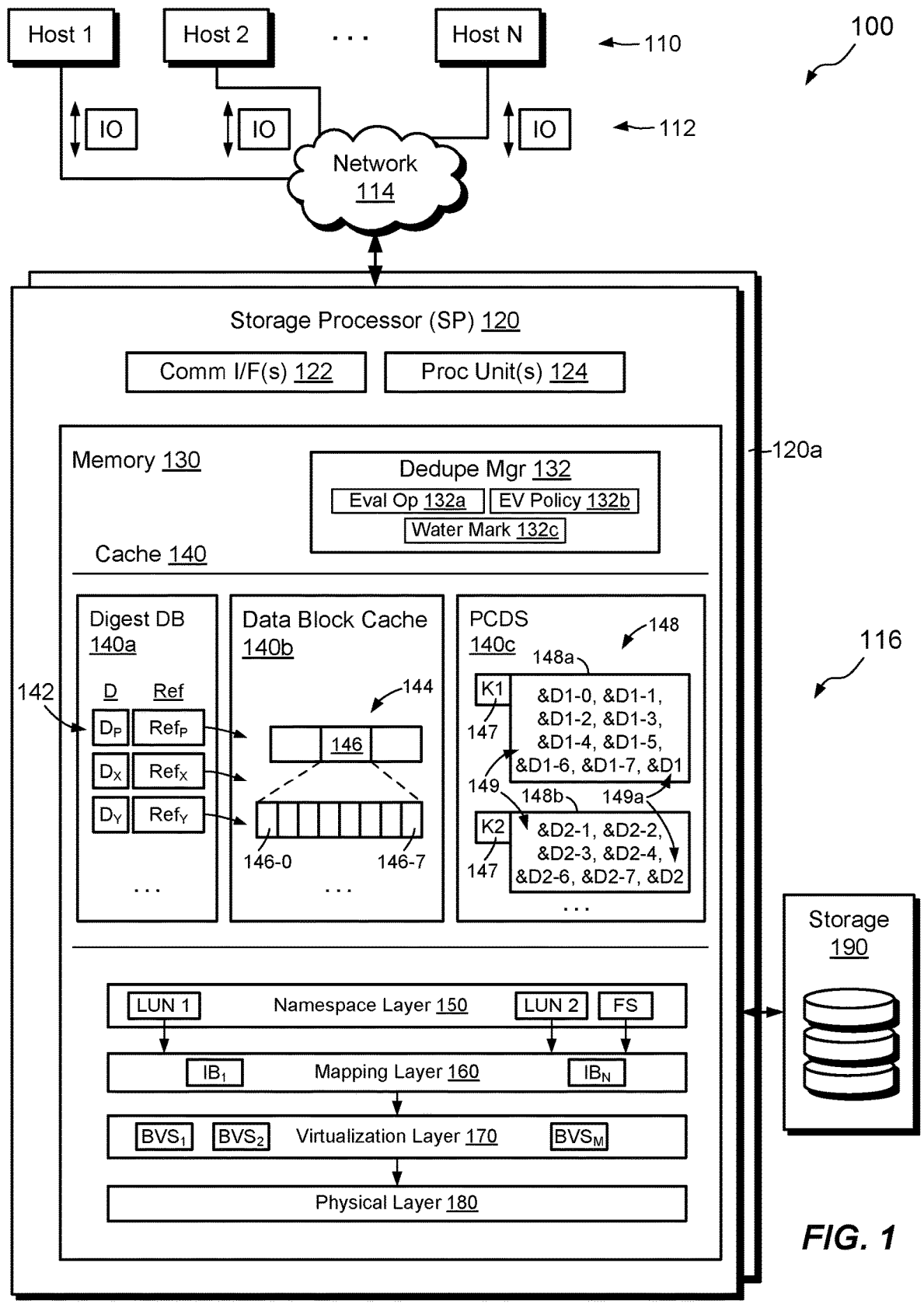
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120*a*). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a deduplication ("dedupe") manager 132, a cache 140, a namespace layer 150, a mapping layer 160, a virtualization layer 170, and a physical layer 180. The dedupe manager 132 is configured to manage deduplication activities involving the cache 140. The cache 140 may be realized in volatile memory (e.g., RAM) and includes a digest database 140*a*, a data block cache 140*b*, and a parent-child data structure (PCDS) 140*c*.

The digest database 140*a* is configured to store digest entries 142 of respective sub-blocks. For example, the digest database 140*a* stores, for each of multiple sub-blocks, a digest "D" of that sub-block and a reference ("Ref") to a location, in the data storage system 116, of a data block that contained the respective sub-block when the digest entry 142 was created. Each digest is computed as a hash of the respective sub-block's contents. Thus, different sub-blocks produce different digests and each digest uniquely identifies a respective sub-block, with hash collisions being possible but highly improbable. The reference Ref may take various forms. For example, Ref may point to a memory location in the data block cache 140*b* where the data block is temporarily being held. Alternatively, Ref may point to metadata (e.g., a block virtualization structure) that maps to the data block, such that a persisted version of the data block may be obtained by following the reference to the pointed-to metadata. In some examples, the reference points directly to the data block, e.g., in the physical layer 180. In some cases, digest entries include multiple references, i.e., one to the data block cache 140*b*, one to the virtualization layer 170, and/or one to the physical layer 180. In some examples, the digest database 140*a* is backed by persistent storage, with portions read into volatile memory as needed for fast access.

The data block cache 140*b* is configured to store temporarily incoming data arriving from hosts 110. The data block cache 140*b* may also store recently read data blocks. In an example, the data block cache 140*b* defines incoming data 144 from hosts 110 in the form of blocks (such as block 146), where each block is composed of a sequence of sub-blocks (e.g., sub-blocks 146-0 through 146-7). As is known, a "block" is a unit of storage in a data storage system, which generally corresponds to the smallest unit of storage space that can be allocated. Block sizes vary from one storage system to the next, with typical sizes being 4 kB (kilobytes) or 8 kB, for example. In the particular arrangement shown, there are eight sub-blocks per block, and the sub-blocks are contiguous and uniform in size. For example, if the block size is 4 kB, each sub-block might be 512 B, which corresponds to one sector.

The PCDS (parent-child data structure) 140*c* is configured to track associations between blocks in the data block cache 140*b* and digest entries 142 for sub-blocks in the digest database 140*a*. For example, the PCDS 140*c* includes multiple records 148. Each record 148 is provided for a respective block in the data block cache 140*b* and stores references 149 to digest entries 142 of sub-blocks of the respective block. References 149 may be provided as memory pointers or other referencing structures. For example, referring to record 148*a*, references &D1-0, &D1-1, &D1-2, &D1-3, &D1-4, &D1-5, &D1-6, and &D1-7 are pointers to the digest entries 142 of the zeroth through seventh sub-blocks of data block D1, the data block for which the record 148*a* was created. In some examples, a reference 149*a* (&D1) is also provided, to point to the respective data block (D1) itself in the data block cache 140*b*. Referring to record 148*b*, references &D2-1, &D2-2, &D2-3, &D2-4, &D2-6, and &D2-7 are pointers to digest entries 142 for sub-blocks of block D2, which itself has a reference 149*a* of &D2.

Keys 147 act as identifiers of records 148. For example, PCDS 140*c* may be arranged as a key-value store, where each key 147 provides a location of a value (contents of records 148). In a particular example, each key 147 is generated for a respective data block by performing a mathematical operation on the contents of that data block. For instance, the mathematical operation is a hash function, such as a MurmurHash. Hash functions permit fast lookups into the PCDS 140*c* based on keys 147, which the SP 120 may compute by hashing a block's contents. Using a hash function also allows the PCDS 140*a* to double as a full-block digest cache, as one can easily hash a new block and look up the new block in the PCDS 140*a* using the resulting key. If the lookup returns a value, then the entire block is a duplicate. The dedupe manager 132 may then deduplicate the block by establishing a pointer to an already-stored block, instead of the data storage system having to allocate new space for the new block.

The above-mentioned mathematical operation may be any operation that produces a different output value for different block contents and that can thus be used to uniquely identify a block. The mathematical operation is therefore not limited to hash functions. In a particular example, the mathematical operation is realized as a hash of the digests of all sub-blocks that make up a block. Thus, rather than computing a hash of an entire block, which can be computationally burdensome, one can instead compute a hash of much smaller digests. The resulting "hash of hashes" can be efficient and effective. It also supports full-block deduplication, as each block may be uniquely identified by the hash of its sub-block hashes.

In some examples, the PCDS 140*c* is configured for storage of "Blobs," i.e., Big logical objects. The blobs may be formatted in a structured manner that allows the SP 120 to identify and obtain references 149 and 149*a* without the need for additional metadata. Thus, a blob-based key-value store provides an efficient data structure for implementing the PCDS 140*c*. This is merely an example, however, as the PCDS 140*c* may be implemented with any suitable data structure or database. One should appreciate that digests may be computed for uniquely identifying larger aggregates of data, such as entire files or blobs.

Continuing with reference to FIG. 1, the namespace layer 150 manages host-accessible data objects, such as LUNs (Logical UNits), file systems, virtual machine disks, and/or the like. Two LUNs and one file system (FS) are shown. The mapping layer 160 includes metadata for mapping blocks of the host-accessible data objects to corresponding sets of block virtualization structures ("BVS's") in the virtualization layer 170. In some examples, one BVS is provided for each addressable data block in the storage system. The mapping layer 160 includes indirect blocks ("IB's"). Each IB is a block that contains an array of block pointers, such as 1024 block pointers. In an example, IB's are arranged in a tree, or in multiple trees, in which block pointers in parent IB's point to child IB's and thus multiply the total number of BVS's (and therefore data blocks) that can be addressed.

In the virtualization layer 170, the BVS's enable the data storage system 116 to deduplicate physical data blocks and to relocate physical data blocks without having to update block pointers in the mapping layer 160. Block pointer updates would be a burdensome task, given that block pointers tend to be much more numerous and widely dispersed than are BVS's.

The physical layer 180 manages the physical data blocks of the data storage system 116. For example, the physical layer 180 is denominated in data blocks of uniform size, such as 4 kB, 8 kB, or the like. Each data block is uniquely addressable. The physical layer 180 is configured to store host data as storage extents in the data blocks. The extents may hold compressed data or uncompressed data. Some extents may be smaller than a block, e.g., if the data are compressed and/or if only a portion of a block's data are uniquely stored. One should appreciate that the physical layer 180 is itself a logical structure and that the bits of data are actually stored in devices of the storage 190. The data storage system 116 may include additional layers, which are not shown, such as a RAID (Redundant Array of Independent (or Inexpensive) Disks) layer, additional mapping layers, and the like. The depicted arrangement is intended merely to be illustrative.

In example operation, the hosts 110 issue I/O requests 112 to the data storage system 116. The SP 120 receives the I/O requests 112 at the communication interfaces 122 and initiates further processing. For example, the SP 120 receives incoming data 144 from hosts 110 and renders the data in block-sized increments of memory, referred to herein simply as "blocks." The data as received from the hosts is not necessarily block-denominated and may arrive in I/O's of any size. Nevertheless, the data block cache 140*b* stores the arriving data as blocks, which the data block cache 140*b* may realize in buffer caches, for example. The size of the buffer caches is preferably configured to match the block size of the data storage system 116.

Certain terminology may be helpful. As described above, a sub-block is identified as "novel" when it does not match any digest entry already stored in the digest database 140*a*. A sub-block is thus considered novel even if it is persisted in storage 190, provided that the sub-block is not currently represented in the digest database 140*a*. In contrast, a sub-block is identified as "duplicate" when it matches a digest entry already stored in the digest database 140*a*. The terms parent, child (or children), and siblings may also be helpful. A "parent" is a block that contains sub-blocks, which are all "children" of that parent. "Siblings" are children of the same parent.

To support sub-block data deduplication, the SP 120 defines multiple sub-blocks for the blocks in the data block cache 140*b*. For example, the SP 120 renders block 146 (a parent) as sub-blocks 146-0 through 146-7 (children and siblings), which are contiguous and uniformly sized. We have recognized that a sub-block size of 512 B (one sector) is particularly well-suited for sub-block deduplication, as many host applications use the sector as a standard size for performing writes. Although host applications may shift data when writing to the data storage system 116, and/or the data storage system 116 may render blocks with different alignment from that with which hosts send their data, such shifts and realignments tend to appear in full-sector increments. Performing deduplication at per-sector granularity thus catches many shifted sectors that conventional, block-based deduplication would miss. Setting the sub-block size to something different from a sector is not excluded from the invention, however.

To perform sub-block deduplication, the dedupe manager 132 may compute sub-block digests from the contents of sub-blocks of data blocks formed in the data block cache 140*b*. The dedupe manager 132 may then search for each computed digest in the digest database 140*a* to determine whether there is a match. If a match is found for a particular sub-block, the dedupe manager 132 may perform a deduplication operation on that sub-block, e.g., by establishing metadata in the mapping layer 160 and/or in the virtualization layer 170, and without physically storing the sub-block again in the storage 190.

If no match is found for a particular sub-block, then the sub-block is novel, and the dedupe manager 132 may create a new entry 142 for that sub-block in the digest database 140*a*. Over the course of time, as the data storage system 116 receives millions of writes, a great mass of sub-blocks will fail to produce matches. The digest database 140*a*, if left unchecked, will quickly grow to an enormous and unmanageable size. Although the cache 140 may employ an eviction policy, merely evicting stale data can result in a digest database 140*a* that contains mostly useless entries, as random data will be overrepresented and data that will likely produce future matches will be sparse.

Significant gains can be achieved, however, by being selective about which sub-block digests are accepted into the digest database 140a in the first instance. In accordance with improvements hereof, the dedupe manager 132 performs an evaluation operation 132a on blocks in the data block cache 140b on a per-block basis. The evaluation operation 132a is arranged to determine whether a given block-under-evaluation has any children that are duplicates. For example, the evaluation operation 132a computes a digest for each sub-block of the block-under-evaluation and performs a trial lookup of each sub-block's digest in the digest database 140a. If the trial lookup turns up a match for even one of the sub-blocks, then the block-under-evaluation fails the evaluation operation 132a and all sub-blocks of the block-under-evaluation are rejected, i.e., excluded from the digest database 140a. No new digest entries 142 are created for any of the sub-blocks of the block-under-evaluation. However, if the trial lookup turns up no matches for any of the sub-blocks, then the block-under-evaluation passes the evaluation operation 132a and all sub-blocks of the block-under-evaluation are accepted, i.e., entered in the digest database 140a. The dedupe manager 132 repeats the evaluation operation 132a for many blocks, and ideally for all blocks formed from data received by the data storage system 116.

In some examples, when rejecting a block's sub-blocks based on an evaluation operation's failure, the failing block-under-evaluation is itself marked for early eviction from the data block cache 140b. For example, the failing block-under-evaluation is kept in cache 140 only long enough to complete processing of a write of that block to the storage 190, after which the block may be discarded from the data block cache 140, as it is not deemed useful for future deduplication. Also, in some examples, no record 148 is created for the failing block-under-evaluation in the PCDS 140c. Thus, rejecting failing blocks from the cache 140 can have cascading effects in reducing cache utilization.

Meanwhile, the blocks that pass the evaluation operation 132a may be admitted into the cache 140. For example, a new digest entry 142 is created for each sub-block of the passing block, a new record 148 is created for the passing block in the PCDS 140c, and the passing block is itself kept in the data block cache 140b for a longer period of time, as the passing block may be useful for future deduplication.

In some examples, the dedupe manager 132 operates in multiple modes. In a first mode, the dedupe manager 132 creates no new digest entries 142 for any sub-blocks of any parent blocks that have one or more child sub-blocks that are duplicates, in the manner described above. In a second mode, the dedupe manager 132 adopts a more lenient policy, accepting new digest entries for any novel sub-blocks, regardless of whether the novel sub-blocks have duplicate siblings. The second mode may be useful in certain scenarios, such as when the cache 140 is initially empty or when its utilization is low. For instance, the dedupe manager 132 may establish a water mark 132c, which describes a predetermined level of fullness. When the cache 140 is operating at a level of fullness above the water mark, the cache 140 may function in the first mode. But when the cache 140 is operating at a level of fullness below the water mark, the cache 140 may function in the second mode. The cache 140 may switch back and forth between modes as its loading changes.

In some examples, the dedupe manager 132 employs an eviction policy 132b. The dedupe manager 132 uses the eviction policy 132b in determining which data to evict from cache 140, so as to prevent the cache 140 from growing indefinitely. The eviction policy 132b may be an LRU (least-recently used) policy, a policy based on access frequency, and/or a policy based on recency patterns, for example. When evicting a block from the data block cache 140b, the dedupe manager 132 may also evict entries 142 in the digest database 140a that reference the evicted block, as well as a record 148 in the PCDS 140c that was created for the evicted block. Example embodiments thus combine acceptance or rejection of data into the cache 140 with eviction of data from the cache 140 to control both the amount and quality of data in the cache 140.

Figure 2:
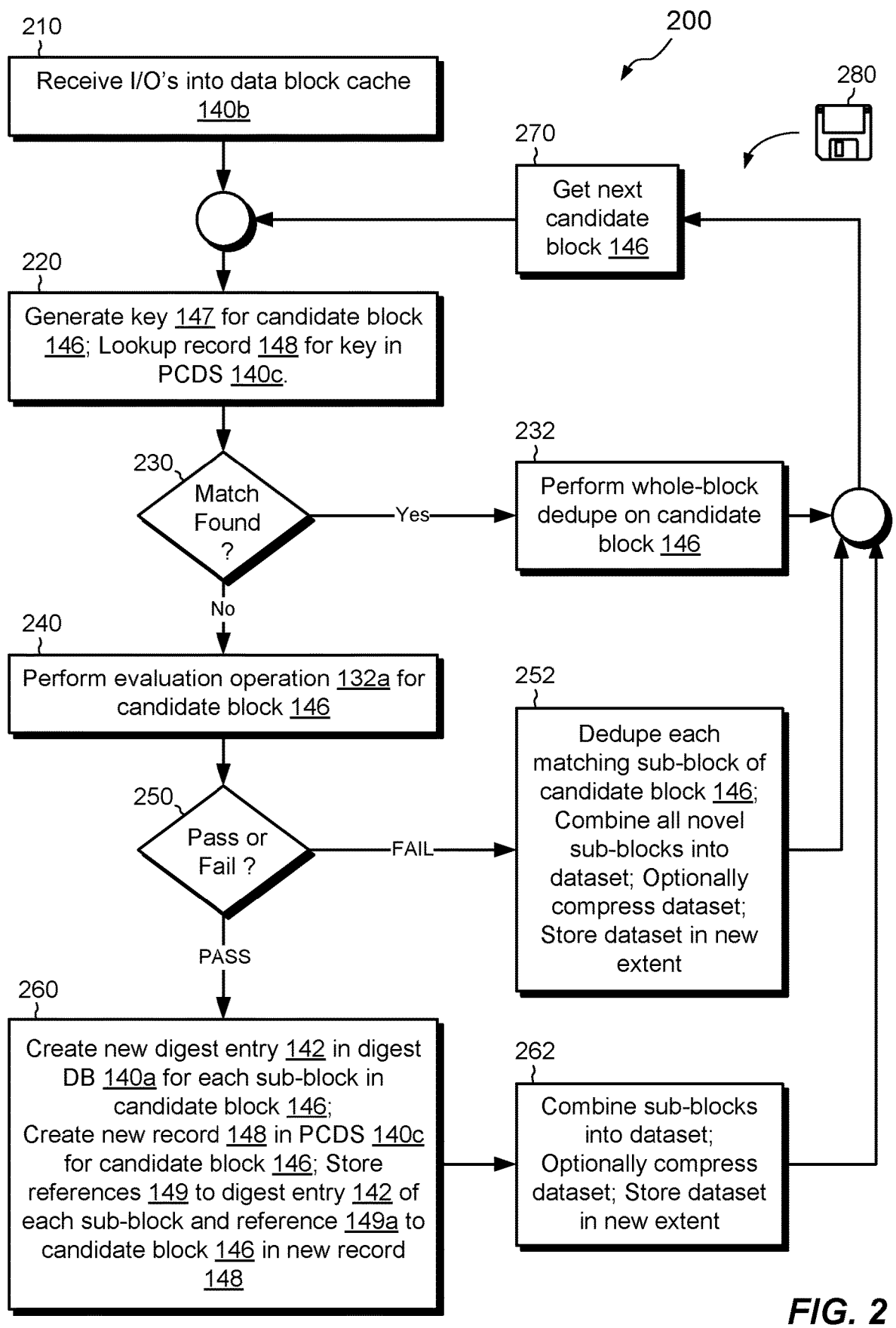
FIG. 2 is a flowchart that shows an example method for performing deduplication in a first mode, while conserving space in a cache.
Figure 3:
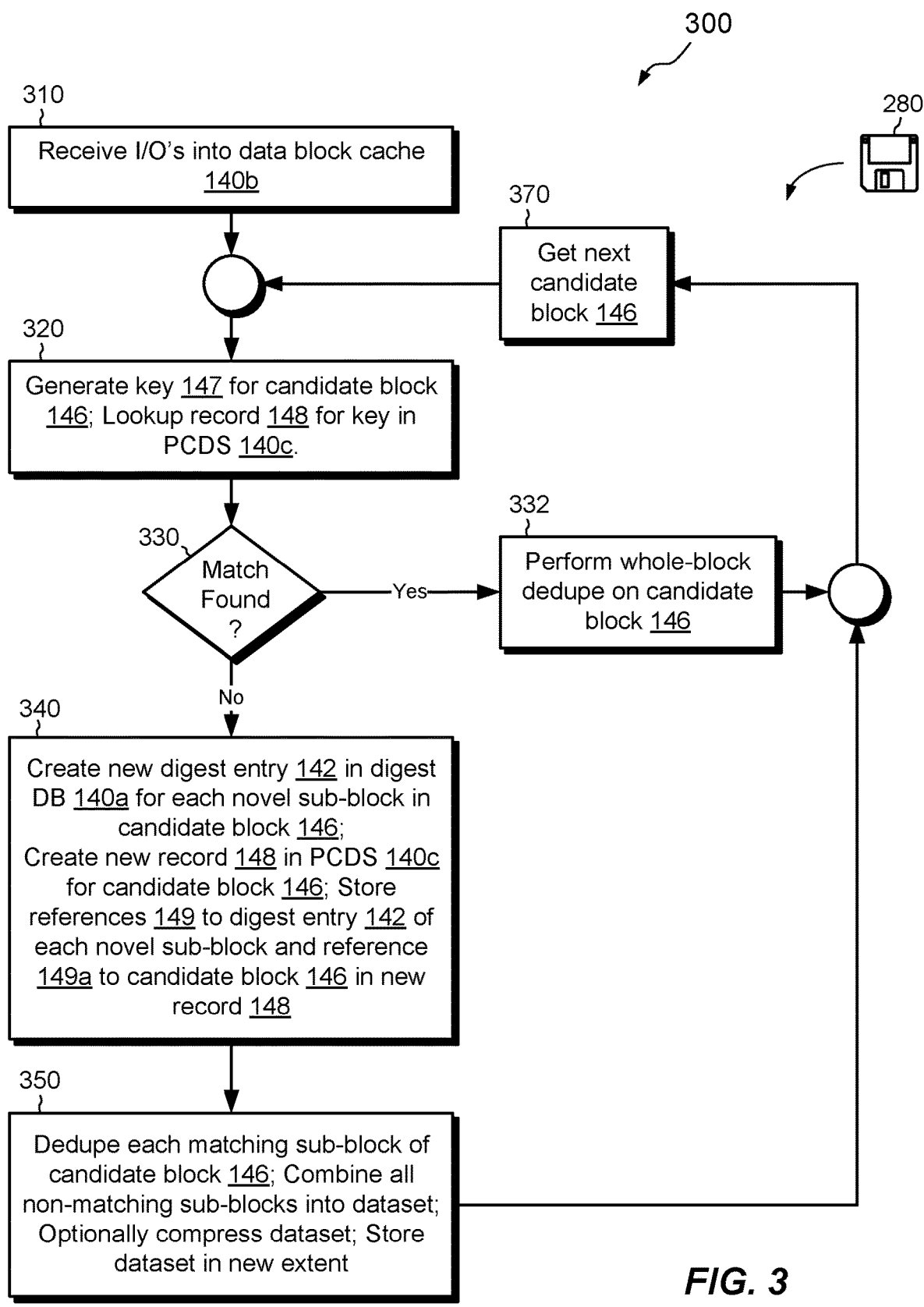
FIG. 3 is a flowchart that shows an example method of performing deduplication in a second mode.
Figure 4:
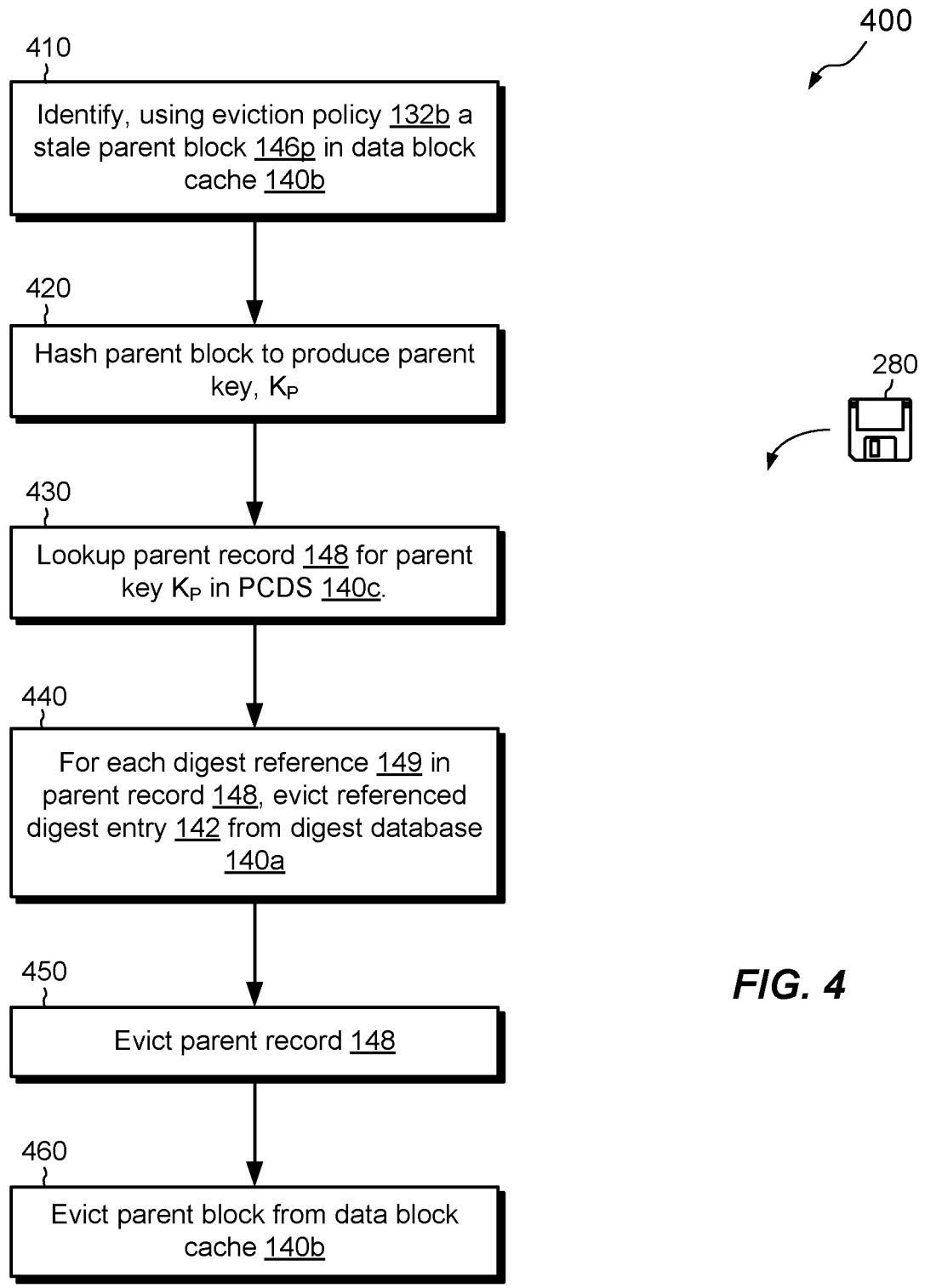
FIG. 4 is a flowchart that shows an example method of evicting contents from the cache.

FIGS. 2-4 show example methods that may be performed in connection with the environment 100. Such methods are typically carried out, for example, by the software constructs shown in FIG. 1, which reside in the memory 130 of the storage processor 120 and are run by the set of processing units 124. The various acts of such methods may be ordered in any suitable way.

FIG. 2 shows an example method 200 for operating in the first mode, i.e., the mode in which sub-blocks are excluded from the cache if their parents contain duplicates. At 210, the data storage system 116 receives I/O requests 112 that specify writes of data. The data are received into data block cache 140a, where the data are rendered as block-sized memory units (blocks). Each such block has a size that matches the block size of the data storage system 116, such as 4 kB, 8 kB, etc., and contains multiple contiguous sub-blocks of uniform size, such as 512 B (one sector).

At 220, the dedupe manager 132 obtains a candidate block 146 from the data block cache 140a and generates a key 147 for that candidate block 146. We refer to block 146 as a "candidate block" as it is a candidate for deduplication. At or around this time, the dedupe manager 132 also performs a lookup in the PCDS 140c for a record 148 having the same key 147.

At 230, if a match is found between the key 147 of the candidate block 146 and an existing record 148 in the PCDS 140c, then operation proceeds to 232, whereupon the dedupe manager 132 performs a whole-block deduplication operation on the candidate block 146, e.g., by establishing metadata in the mapping layer 160 and/or in the virtualization layer 170 that points to an already-stored version of the same contents in storage 190, thus avoiding redundant storage of those contents. Then, at 270, the dedupe manager 132 obtains a new candidate block 146 from the data block cache 140a, and operation returns to 220.

However, if no match is found at 230 to the key 147 of the candidate block 146, operation proceeds instead to 240, whereupon the dedupe manager 132 performs an evaluation operation 132a on the candidate block 146. At 250, the evaluation operation 132a succeeds (PASS) if none of the sub-blocks of the candidate block 146 are duplicates, i.e., if none of them can be found in the digest database 140a, e.g., after performing a trial lookup. Otherwise, the evaluation operation 132a fails (FAIL), if one or more sub-blocks of the candidate block 146 is a duplicate.

If the evaluation operation fails, control proceeds to 252. Here, no new digest entries 142 are created for the candidate block 146 and no new record 148 is created in the PCDS 140c. The presence of duplicate sub-blocks does signal an opportunity for partial deduplication, however. To that end, the dedupe manager 132 directs deduplication of each of the matching sub-blocks, e.g., by configuring metadata in the mapping and/or virtualization layers. The SP 120 combines all novel (non-matching) sub-blocks into a single dataset, preferably with gaps removed, and stores the dataset in a storage extent in the physical storage layer 180. Optionally, the SP 120 compresses the dataset prior to storing it. Because the dataset contains anywhere between one and eight sub-blocks (assuming eight sub-blocks per block), chances are good that the dataset will be larger than a single sub-block. We have recognized that compression ratios tend to improve as datasets get larger. Combining novel sub-blocks into one dataset before compressing the dataset as a whole is thus expected to yield higher compression ratios than could be achieved by compressing sub-blocks individually. Operation next proceeds to 270, at which point another candidate block 146 is obtained and the process repeats.

Returning to 250, if the evaluation operation on the candidate block 146 passed, operation proceeds to 260, where the dedupe manager 132 creates a new digest entry 142 in the digest database 140a for each sub-block of the candidate block 146. In addition, the dedupe manager 132 creates a new record 148 for the candidate block 146 in the PCDS 140c. When creating the new record 148, the dedupe manager 132 stores a reference 149 to each of the newly created digest entries 142. It also stores a reference 149a to the candidate block 146 in the data block cache 140b.

Operation then proceeds to 262, whereupon the sub-blocks of candidate block 146 are combined into a single extent, which may be compressed and stored as described at 252 above. Operation then proceeds to 270, where the dedupe manager 232 obtains a new candidate block 146 and the process repeats. Acts 260 and 262 may be performed simultaneously or in any order.

FIG. 3 shows an example method 300 for operating in the second mode, i.e., the mode in which novel sub-blocks are admitted to the cache regardless of whether their parents contain duplicates or not. Acts 310, 320, 330, 332, and 370 are the same as acts 210, 220, 230, 232, and 270 of FIG. 2, respectively. In brief summary, new data are received and rendered as blocks containing sub-blocks (310). A key 147 is generated from a candidate block 146 and is applied to the PCDS 140c (320). If the key 147 matches to a record 148 in the PCDS 140c (320), a whole-block deduplication is performed (332) and a next candidate block 146 is obtained (370). Otherwise, operation proceeds to 340, where the methods 200 and 300 depart, as no evaluation operation 132a is required in method 300.

Rather, at 340, the dedupe manager 132 creates a new digest entry 142 in the digest database 140a for each novel sub-block in the candidate block 146, i.e., for each sub-block that is not a duplicate. The dedupe manager 132 also creates a new record 148 for the candidate block 146 in the PCDS 140c. When creating the new record 148, the dedupe manager 132 stores a reference 149 to each digest entry 142 created for each novel sub-block of the candidate block 146, also storing a reference 149a to the candidate block 146 itself in the data block cache 140b.

At 350, the dedupe manager 132 directs deduplication of each of the duplicate sub-blocks of the candidate block 146, e.g., by configuring metadata in the mapping and/or virtualization layers. The SP 120 combines all novel (non-matching) sub-blocks into a single dataset, preferably with gaps removed, and stores the dataset in a storage extent in the physical storage layer 180, optionally compressing the dataset prior to storing it. Operation then proceeds to 370, at which point another candidate block 146 is obtained and the process repeats. Acts 340 and 350 may be performed simultaneously or in any order.

FIG. 4 shows an example method 400 for performing cache eviction in the environment 100. The acts of method 400 are typically performed by the dedupe manager 132, which operates in accordance with the eviction policy 132b, such as an LRU policy, for example.

At 410, the dedupe manager 132 identifies a stale or otherwise unproductive parent block 146p in the data block cache 140a. At 420, the dedupe manager 132 hashes the parent block 146p to produce a parent key, K. At 430, the dedupe manager 132 performs a lookup or otherwise searches the PCDS 140c for a record 148 corresponding to K. Upon locating a matching record 148 (at 440), the dedupe manager 132 identifies the references 149 to the sub-block digest entries 142, i.e., for the sub-blocks of the parent block 146p, and proceeds to evict those sub-block digest entries from the digest database 140a. At 450, the dedupe manager 132 evicts the parent record 148 from the PCDS 140c, and, at 460, the dedupe manager 132 evicts the parent block 146p from the data block cache 140b. Acts 440, 450, and 460 may be performed in any order, or simultaneously.

Figure 5:
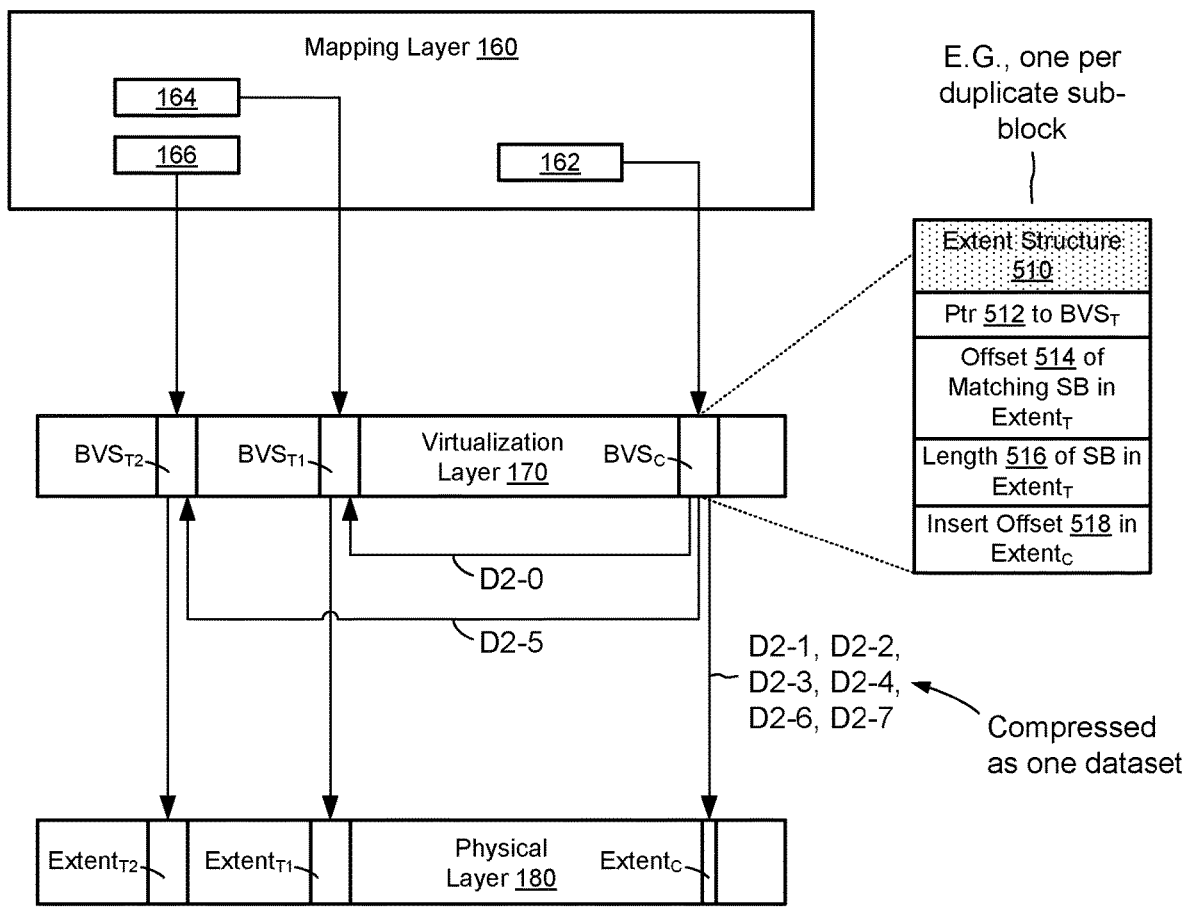
FIG. 5 is a block diagram of an example arrangement in which mapping metadata is provided in a virtualization layer for supporting sub-block deduplication.

FIG. 5 shows a first example of metadata structures that may be used for sub-block deduplication. Here, the mapping layer 160 includes block pointers 162, 164, and 166, which may be located in respective leaf indirect blocks (IBs), such as those shown in FIG. 1. Each of block pointers 162, 164, and 166 points to a respective block virtualization structure (BVS) in the virtualization layer 170. For example, block pointer 162 points to $BVS_C$, block pointer 164 points to $BVS_{T1}$, and block pointer 166 points to $BVS_{T2}$. Block pointer 162 and $BVS_C$ participate in mapping a candidate block 146, which is backed by $Extent_C$ in the physical layer 180, while block pointers 164 and 166 participate in mapping target blocks T1 and T2, respectively, which are backed by $Extent_{T1}$ and $Extent_{T2}$. Target blocks T1 and T2 were previously stored and are the target of deduplication matches.

In the example shown, candidate block 146 corresponds to block D2 as described in connection with FIG. 1. Thus, the candidate block 146 includes six novel sub-blocks (D2-1, D2-2, D2-3, D2-4, D2-6, and D2-7) and two duplicate sub-blocks (D2-0 and D2-5). We assume for purposes of illustration that duplicate sub-block D2-0 has matched to an identical target sub-block in target block T1 and that duplicate sub-block D2-5 has matched to an identical target sub-block in target block T2.

To effect deduplication of sub-block D2-0, $BVS_C$ is equipped with an extent structure 510 that points to $BVS_{T1}$ and identifies the particular location within block T1 where the matching sub-block can be found. Likewise, to effect deduplication of D2-5, $BVS_C$ is equipped with a second extent structure 510 (not shown) that points to $BVS_{T2}$ and identifies the particular location within block T2 of the matching sub-block. The extent structures 510 thus account for duplicate sub-blocks and avoid the need to separately store them. As for the novel sub-blocks of the candidate block 146, they are preferably compacted together (to remove gaps), preferably compressed as a single dataset, and then placed in $Extent_C$. The metadata structures shown in FIG. 5 thus account for all content of the candidate block 146, even though different sub-blocks of the candidate block 146 are stored at different locations.

The example extent structure 510 includes the following metadata elements:

Pointer 512. An address of $BVS_{T1}$ (or $BVS_{T2}$), i.e., the BVS of the target block, where the target sub-block resides in the virtualization layer 170.

Offset 514. Offset of the target sub-block in $Extent_{T1}$ (or $Extent_{T2}$).

Length 516. The number of contiguous target sub-blocks in the matching range; can be greater than one if there is greater than one match in the same target block.

Insert Offset 518. An offset relative to the candidate block 146 where the contents of the target range are to be inserted when reconstituting the candidate block 146.

The extent structures 510 thus provide all the information needed to locate all of the components of the candidate block 146 and to reconstruct the block when requested, e.g., when performing reads.

Figure 6:
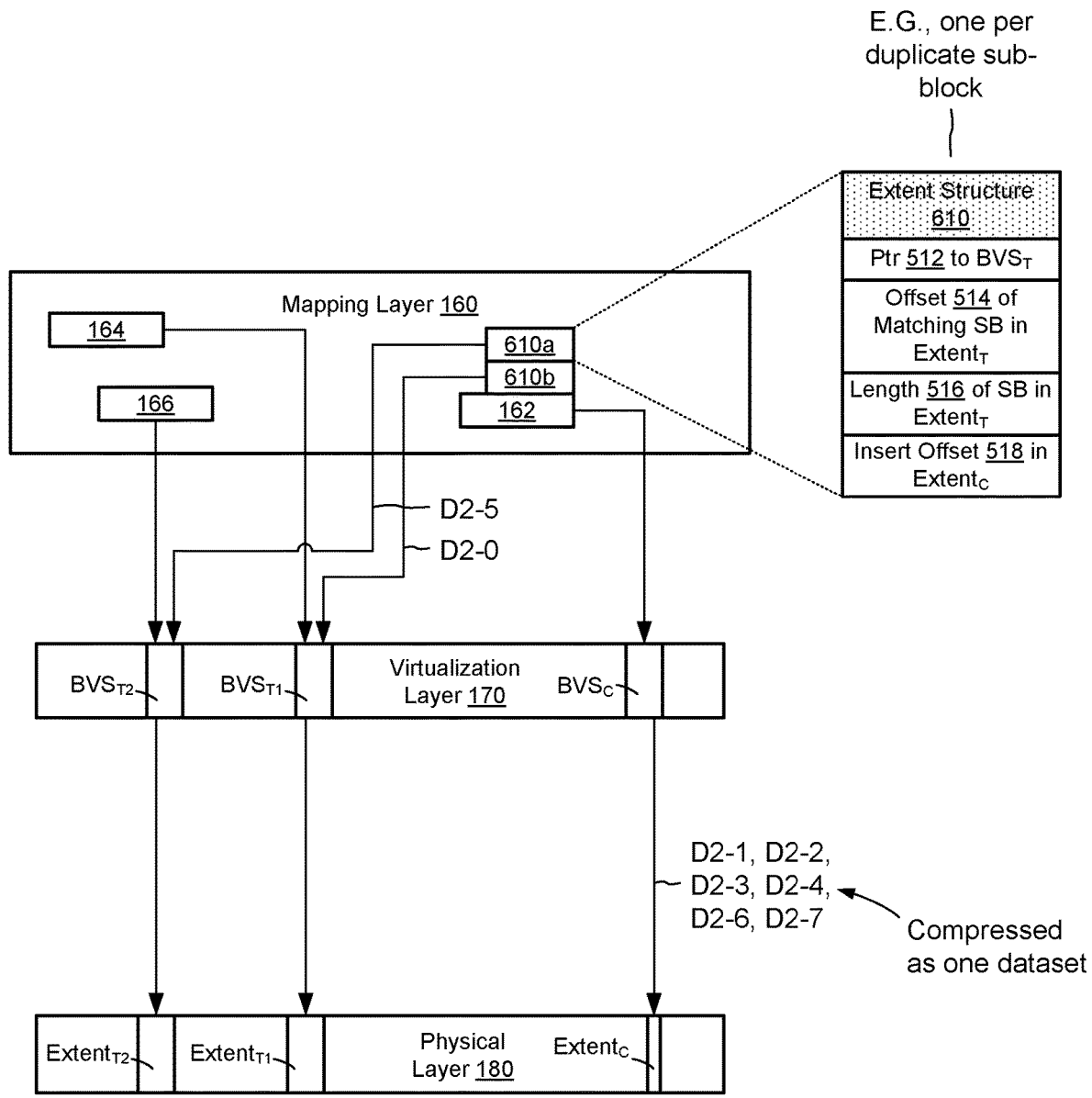
FIG. 6 is a block diagram of an example arrangement in which mapping metadata is provided in a mapping layer for supporting sub-block deduplication.

FIG. 6 shows a second example of metadata structures that may be used for supporting sub-block deduplication. In this case, rather than locating the extent structures 510 in the BVS's, extent structures 610 are instead located in the mapping layer, e.g., within leaf IBs. Placing extent structures 610*a* and 610*b* in a leaf IB has the inherent advantage of avoiding multiple hops. In FIG. 5, the SP 120 would have to access $BVS_C$ and read its extent structures 510 before it could access $BVS_{T1}$ and $BVS_{T2}$. By contrast, locating the extent structures 610*a* and 610*b* in the leaf IB, e.g., alongside the associated block pointer 162, allows the SP 120 to access $BVS_C$, $BVS_{T1}$, and $BVS_{T2}$ in parallel, promoting faster processing.

As the leaf IB is itself a block, which has limited space, it may be preferable in some examples to compress the contents of the leaf IB when many extent structures 610 are needed. Each leaf IB includes a header and an array of block pointers. In an example, the header is marked with a label that identifies the pointers as compressed or uncompressed, and the array of block pointers (but not the header) is compressed, along with the associated extent structures 610. In this manner, ample space may be made available for any required number of extent structures 610.

Figure 7:
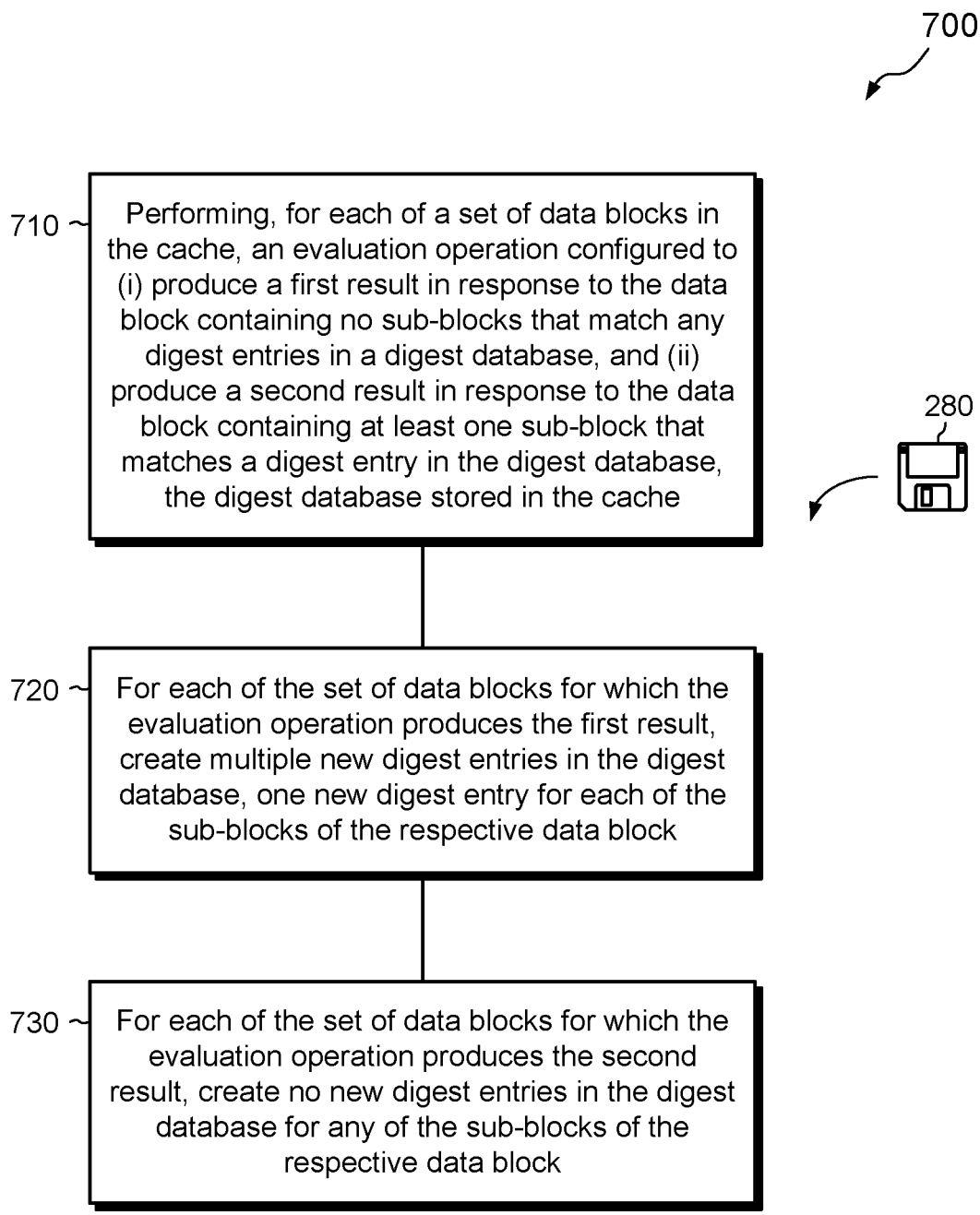
FIG. 7 is a flowchart that shows an example method of managing cache in a data storage system that supports deduplication.

FIG. 7 shows a method 700 which may be carried out in connection with the environment 100. The method 700 is typically performed, for example, by the software constructs described in connection with FIG. 1, which reside in the memory 130 of the storage processor 120 and are run by the set of processing units 124. The various acts of method 700 may be ordered in any suitable way. Accordingly, embodiments may be constructed in which acts are performed in orders different from that illustrated, which may include performing some acts simultaneously.

At 710, an evaluation operation 132*a* is performed for each of a set of data blocks in the cache 140. The evaluation operation 132*a* is configured to (i) produce a first result (PASS) in response to a data block 146 containing no sub-blocks that match any digest entries 142 in a digest database 140*a*, and (ii) produce a second result (FAIL) in response to the data block 146 containing at least one sub-block that matches a digest entry 142 in the digest database 140*a*. The digest database 140*a* is operated in the cache 140.

At 720, for each of the set of data blocks for which the evaluation operation 132*a* produces the first result (PASS), multiple new digest entries 142 are created in the digest database 140*a*, one new digest entry 142 for each of the sub-blocks of the respective data block 146.

At 730, for each of the set of data blocks for which the evaluation operation produces the second result (FAIL), no new digest entries are created in the digest database 140*a* for any of the sub-blocks of the respective data block 146.

An improved technique has been described for managing a cache 140 in a data storage system 116 that supports data deduplication. The technique renders each of a set of data blocks 146 as multiple sub-blocks and loads a cache-resident digest database 140*a* on a per-block basis, selectively creating new digest entries 142 in the database for all sub-blocks in a block, but only for blocks that contain no duplicate sub-blocks. Sub-blocks of blocks containing duplicates are excluded. Advantageously, the improved technique avoids initial creation of digest entries 142 for sub-blocks that are unlikely to result in future deduplication matches, and thus biases the cached entries in favor of entries that are more likely to produce matches later.

Having described certain embodiments, numerous alternative embodiments or variations can be made. For example, although techniques have been described for performing data deduplication inline with I/O requests 112, similar techniques can be applied when performing deduplication in the background. Background deduplication can proceed substantially as described above, except that the dedupe manager 132 obtains candidate blocks 146 from persistent storage, rather than from incoming I/O requests 112.

Also, the above description has indicated that certain structures "reference" or "point to" other structures. One should appreciate that any such reference or pointing can be direct or indirect, meaning that intervening pointing structures may also be present. Further, although referenced or pointed-to structures may be identified hereinabove as "blocks," such blocks need not be persistently-stored versions. For example, such blocks may be cached versions of data blocks, or memory-resident structures that have not yet been stored on persistent storage devices.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 280 in FIGS. 2-4 and 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing cache in a data storage system that supports data deduplication, the method comprising:
performing, for each data block of a plurality of data blocks in the cache, an evaluation operation configured to (i) produce a first result in response to the respective data block of the plurality of data blocks containing no sub-blocks that match any digest entries in a digest database, and (ii) produce a second result in response to the respective data block of the plurality of data blocks containing at least one sub-block that matches a digest entry in the digest database, the digest database stored in the cache; and
selectively processing each data block of the plurality of data blocks along one of a first path and a second path, including—
for each first-result data block of a first set of data blocks for which the evaluation operation produces the first result, processing the respective first-result data block along the first path, including creating multiple new digest entries in the digest database, one new digest entry for each of the sub-blocks of the respective first-result data block; and
for each second-result data block of a second set of data blocks for which the evaluation operation produces the second result, processing the respective second-result data block along the second path, including creating no new digest entries in the digest database for any of the sub-blocks of the respective second-result data block, wherein at least one of the second set of data blocks includes a sub-block that does not match any digest entry in the digest database.

2. The method of claim 1, wherein the digest database contains multiple digest entries, each of the digest entries provided for a respective sub-block and including a reference to a parent block in the cache that contains the respective sub-block.

3. The method of claim 2, further comprising implementing an eviction policy for the cache.

4. The method of claim 3, wherein the eviction policy includes an LRU (Least Recently Used) policy.

5. The method of claim 3, further comprising providing a parent-child data structure (PCDS) that associates parent blocks in the cache with respective references to digest entries of child sub-blocks of the respective parent blocks.

6. The method of claim 5, wherein the PCDS stores a respective record for each of multiple parent blocks, each record located using a respective key that uniquely identifies the record, each key formed by performing a mathematical operation on contents of the parent block.

7. The method of claim 6, wherein the PCDS is stored in the cache, and wherein the method further comprises:
identifying a parent block to be evicted from the cache in accordance with the eviction policy;
performing the mathematical operation on the identified parent block to produce a parent key;
performing a look-up in the PCDS for a parent record uniquely identified by the parent key; and
evicting, from the digest database, each digest entry referenced in the parent record.

8. The method of claim 7, further comprising:
evicting the parent record from the PCDS; and
evicting the identified parent block from the cache.

9. The method of claim 6, further comprising:
forming a new block in the cache;
performing the mathematical operation on the new block to produce a new key;
performing a look-up in the PCDS for a record uniquely identified by the new key; and
in response to finding the record uniquely identified by the new key, performing a full-block-based deduplication operation on the new block.

10. The method of claim 3, further comprising:
forming a set of prior data blocks in the cache; and
for each of the set of prior data blocks, creating a new digest entry in the digest database for each novel sub-block contained in the prior data block, regardless of whether the prior data block also contains any duplicate sub-blocks,
wherein a sub-block is "novel" when it does not match any digest entry already stored in the digest database and is "duplicate" when it matches a digest entry already stored in the digest database.

11. The method of claim 10, wherein the cache operates in multiple modes, the modes including (i) a first mode in which the cache performs the evaluation operation and selectively creates digest entries for all sub-blocks or for no sub-blocks of respective data blocks, depending on results of the evaluation operation, and (ii) a second mode in which the cache creates new entries for novel sub-blocks, regardless of whether the novel sub-blocks have siblings that are duplicate sub-blocks.

12. The method of claim 11,
wherein the cache operates in the first mode in response to a fullness of the cache exceeding a predetermined water mark, and
wherein the cache operates in the second mode in response to the fullness of the cache being less than the predetermined water mark.

13. The method of claim 3, further comprising, upon identifying multiple novel sub-blocks and a set of duplicate sub-blocks in a data block:
deduplicating each of the set of duplicate sub-blocks by matching each duplicate sub-block to a sub-block already stored in the data storage system;
placing the novel sub-blocks together in a single dataset;
compressing the dataset to produce a compressed dataset; and
storing the compressed data set in a storage extent.

14. The method of claim 1, wherein processing each respective block of the second set of data blocks along the second path further includes performing deduplication on each matching sub-block of the respective data block, each matching sub-block matching an entry in the digest database.

15. A data storage system, comprising control circuitry that includes a set of processing units coupled to memory, the control circuitry constructed and arranged to:
perform, for each data block of a plurality of data blocks in the cache, an evaluation operation configured to (i) produce a first result in response to the respective data block of the plurality of data blocks containing no sub-blocks that match any digest entries in a digest database, and (ii) produce a second result in response to the respective data block of the plurality of data blocks containing at least one sub-block that matches a digest entry in the digest database, the digest database stored in the cache; and selectively process each data block of the plurality of data blocks along one of a first path and a second path, including for each first-result data block of a first set of data blocks for which the evaluation operation produces the first result, process the respective first-result data block along the first path to create multiple new digest entries in the digest database, one new digest entry for each of the sub-blocks of the respective first-result data block; and for each second-result data block of a second set of data blocks for which the evaluation operation produces the second result, process the respective second-result data block along the second path to create no new digest entries in the digest database for any of the sub-blocks of the respective second-result data block, wherein at least one of the second set of data blocks includes a sub-block that does not match any digest entry in the digest database.

16. A computer program product including a set of non-transitory, computer-readable media having instructions which, when executed by control circuitry of a data storage system that supports data deduplication, cause the control circuitry to perform a method of managing cache, the method comprising:

performing, for each data block of a plurality of data blocks in the cache, an evaluation operation configured to (i) produce a first result in response to the respective data block of the plurality of data blocks containing no sub-blocks that match any digest entries in a digest database, and (ii) produce a second result in response to the respective data block of the plurality of data blocks containing at least one sub-block that matches a digest entry in the digest database, the digest database stored in the cache; and selectively processing each data block of the plurality of data blocks along one of a first path and a second path, including for each first-result data block of a first set of data blocks for which the evaluation operation produces the first result, processing the respective first-result data block along the first path, including creating multiple new digest entries in the digest database, one new digest entry for each of the sub-blocks of the respective first-result data block; and for each second-result data block of a second set of data blocks for which the evaluation operation produces the second result, processing the respective second-result data block along the second path, including creating no new digest entries in the digest database for any of the sub-blocks of the respective second-result data block, wherein at least one of the second set of data blocks includes a sub-block that does not match any digest entry in the digest database.

17. The computer program product of claim 16, wherein the method further comprises providing a parent-child data structure (PCDS) that associates parent blocks in the cache with respective references to digest entries of child sub-blocks of the respective parent blocks.

18. The computer program product of claim 17, wherein the PCDS stores a respective record for each of multiple parent blocks, each record located using a respective key that uniquely identifies the record, each key formed by performing a mathematical operation on contents of the parent block.

19. The computer program product of claim 16, wherein the cache operates in multiple modes, the modes including (i) a first mode in which the cache performs the evaluation operation and selectively creates digest entries for all sub-blocks or for no sub-blocks of respective data blocks, depending on results of the evaluation operation, and (ii) a second mode in which the cache creates new entries for novel sub-blocks, regardless of whether the novel sub-blocks have siblings that are duplicate sub-blocks.

20. The computer program product of claim 19, wherein the cache operates in the first mode in response to a fullness of the cache exceeding a predetermined water mark, and wherein the cache operates in the second mode in response to the fullness of the cache being less than the predetermined water mark.

21. The computer program product of claim 16, further comprising, upon identifying multiple novel sub-blocks and a set of duplicate sub-blocks in a data block:

deduplicating each of the set of duplicate sub-blocks by matching each duplicate sub-block to a sub-block already stored in the data storage system;

placing the novel sub-blocks together in a single dataset;

compressing the dataset to produce a compressed dataset; and storing the compressed data set in a storage extent, wherein a sub-block is "novel" when it does not match any digest entry already stored in the digest database and is "duplicate" when it matches a digest entry already stored in the digest database.

* * * * *